United States Patent
Frias (10) Patent No.: US 8,281,474 B2
(45) Date of Patent: Oct. 9, 2012

(54) TOOL AND METHOD OF USE FOR EXTRACTION OF FAILED WHEEL BEARINGS

(76) Inventor: Roberto Frias, Anton, TX (US)

( * ) Notice: Subject to any disclaimer, the term of this patent is extended or adjusted under 35 U.S.C. 154(b) by 526 days.

(21) Appl. No.: 12/538,161

(22) Filed: Aug. 10, 2009

(65) Prior Publication Data

US 2011/0030189 A1 Feb. 10, 2011

(51) Int. Cl.
*B23P 19/04* (2006.01)
(52) U.S. Cl. .................................................. 29/426.5
(58) Field of Classification Search ............. 29/426.5, 29/244, 270, 280, 426.1, 275, 278
See application file for complete search history.

(56) References Cited

U.S. PATENT DOCUMENTS

| | | | |
|---|---|---|---|
| 1,364,489 A * | 1/1921 | Edelblut | ......................... 29/275 |
| 3,358,353 A | 12/1967 | Bares | |
| 4,050,136 A | 9/1977 | Shultz | |
| 4,429,447 A | 2/1984 | Davis | |
| 6,098,261 A | 8/2000 | Goguen | |

\* cited by examiner

*Primary Examiner* — John C Hong
(74) *Attorney, Agent, or Firm* — Roman Aguilera, III (57) ABSTRACT

A tool and method of use directed to the extraction of a wheel bearing's outer ring. When a tractor or trailer's wheel bearing fails and is in need of replacement, the present invention provides for a quick and easy means of extracting the remaining wheel bearing component residing in the wheel rim, the outer ring. The tractor wheel bearing extraction tool of the present invention is comprised of two pieces. The first piece is inserted into the wheel cylinder within the wheel rim and locks to the wheel bearing outer ring. The tool's first piece thus provides for a punching back for the second piece of the tractor wheel bearing extraction tool. The second piece is a hammering rod and is inserted into the opposite end of the wheel cylinder within the wheel rim. The hammering rod locks into the first piece and allows the user to hammer out the outer ring wheel bearing component with one strike.

3 Claims, 8 Drawing Sheets

TOOL AND METHOD OF USE FOR EXTRACTION OF FAILED WHEEL BEARINGS

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATING-BY-REFERENCE OF MATERIAL SUBMITTED ON A COMPACT DISC

Not applicable

SEQUENCE LISTING

Not applicable

FIELD OF THE INVENTION

The present invention relates to a tool and method for the extraction of wheel bearings. More specifically, the present invention relates to a mechanical device and method of use for extracting a tractor's and trailer's outer ring wheel bearing component when a wheel bearing has experienced failure and is need of replacement.

BACKGROUND OF THE INVENTION

Without limiting the scope of the disclosed tool and method, the background is described in connection with a novel approach to the extraction of the outer ring wheel bearing component after a wheel bearing has experienced failure.

Wheel bearings of tractors and trailers begin to fail after about a year of use. Once the wheel bearing has failed, this component must be replaced before the wheel on the tractor or trailer will become operational.

A wheel bearing is composed of three parts: outer ring, inner ring, and the ball bearings which reside between the outer and inner rings. When a wheel bearing fails, the inner ring and the ball bearings will dislocate from the wheel. The failed bearing will leave the outer ring within the wheel hub. In order to replace the wheel bearing unit, the wheel bearing outer ring must be removed from the wheel hub. Without proper tools, this effort can be tedious and time consuming. Many repair shops resort to welding the outer ring out of the wheel hub. Moreover, the removal of failed bearings is also effected with tools that are adjustable with pivot pins, slots and screws. These tools have a tendency to loosen, to wear out and slip, damaging the wheel hubs internal structures. Many of the tools are also directed towards extracting out worn bearings that have not failed and thus all of the components are still within the wheel hub.

A first example of an adjustable bearing remover of the prior art is described in U.S. Pat. No. 3,358,353 issued on Dec. 19, 1967 to Jack A. Bares et al. In this example, the device comprises a pair of prongs with notches on a driven end of these prongs, and an anvil cap enclosing the driving end. The prongs are movable about a pivot axis in the anvil cap, to adjust the notches to different diameters of bearings. When the notches are engaged with the edge of a bearing race, a hammer is used to strike the anvil cap and push the bearing race out of its seat.

A second example of a bearing race driver is described in U.S. Pat. No. 4,050,136 issued on Sep. 27, 1977 to William E. Shultz. This tool is an impact type tool made of six conical grooved segments that are held together by a resilient retainer against a conical wedge member. The adjustment of the wedge member along a threaded rod causes the grooved segments to expand to different diameters.

A third example of an impact tool for working bearings is described in U.S. Pat. No. 4,429,447 issued on Feb. 7, 1984 to Marvin A. Davis. The bearing cup installation tool described therein has three prongs that are movable toward and away from each other about respective pivots in a core block. Each prong is movable by the adjustment of a cam disc along a threaded rod extending from the core block, to cause the cam disc to slide along a respective cam bar on each prong.

A fourth example of a tool for working with bearings is described in U.S. Pat. No. 6,098,261 issued on Aug. 8, 2000 to Roland Goguen. In this example, the device described utilizes a punch head and is inserted at an angle into the wheel hub to knock out the bearing components.

In reality, impact tools that are made of several moving parts are often improperly adjusted, causing the tools to deflect and often slip out of its engagement with a bearing cup or cone. Repeat impacts on these tools often cause the moving parts to loosen up and adversely affect the adjustability of the tools. As a result, the bearing jobs done in many garages are often carried out using defective tools, and the bearing installations are sometimes below acceptable quality standards.

Furthermore there are still, unfortunately, many shops and mechanics that use punches and chisels for removing a wheel bearing outer ring from a wheel hub. The use of such tools is common amongst small shops and work that is conducted remotely, with the unfortunate consequences of damaging bearing seats and shortening the life of all subsequent bearing installations.

The present invention proposes a novel tool and method of use for the extraction of the wheel bearing outer ring component after the wheel bearing has failed.

BRIEF SUMMARY OF THE INVENTION

The present invention, therefore, provides a tool and method of use for extracting a tractor's and trailer's outer ring wheel bearing component when a wheel bearing has experienced failure and is need of replacement.

The tractor wheel bearing extraction tool of the present invention is comprised of two pieces. The first piece is inserted into the wheel cylinder within the wheel rim and locks to the wheel bearing outer ring. The tool's first piece thus provides for a punching back for the second piece of the tractor wheel bearing extraction tool. The second piece is a hammering rod and is inserted into the opposite end of the wheel cylinder within the wheel rim. The hammering rod locks into the first piece and allows the user to hammer out the outer ring wheel bearing component. It is the first tool to allow a quick and easy extraction of a wheel bearing's outer ring in such a manner and is distinct from existing tools, such as pointed punches and chisels. In addition, these other extraction tools are not as efficient and effective. For instance, with other tools, due to their design, they tend to fail much quicker and do not lock to the outer ring in a safe and secure manner. Therefore, a new tool and approach is needed in the art.

In summary, the present invention discloses an improved tool and method of use for extracting a tractor's and trailer's outer ring wheel bearing component when a wheel bearing has experienced failure and is need of replacement.

More specifically, by extension, the disclosed method and apparatus can be used to extract outer rings in failed wheel bearings in various types of machines and vehicles.

BRIEF DESCRIPTION OF THE SEVERAL VIEWS OF THE DRAWINGS

For a more complete understanding of the features and advantages of the present invention, reference is now made to the detailed description of the invention along with the accompanying figures in which.

DETAILED DESCRIPTION OF THE INVENTION

Disclosed herein is an improved tool and method of use for extracting a tractor's and trailer's outer ring wheel bearing component when a wheel bearing has experienced failure and is need of replacement. The numerous innovative teachings of the present invention will be described with particular reference to several embodiments (by way of example, and not of limitation).

Figure 1A:
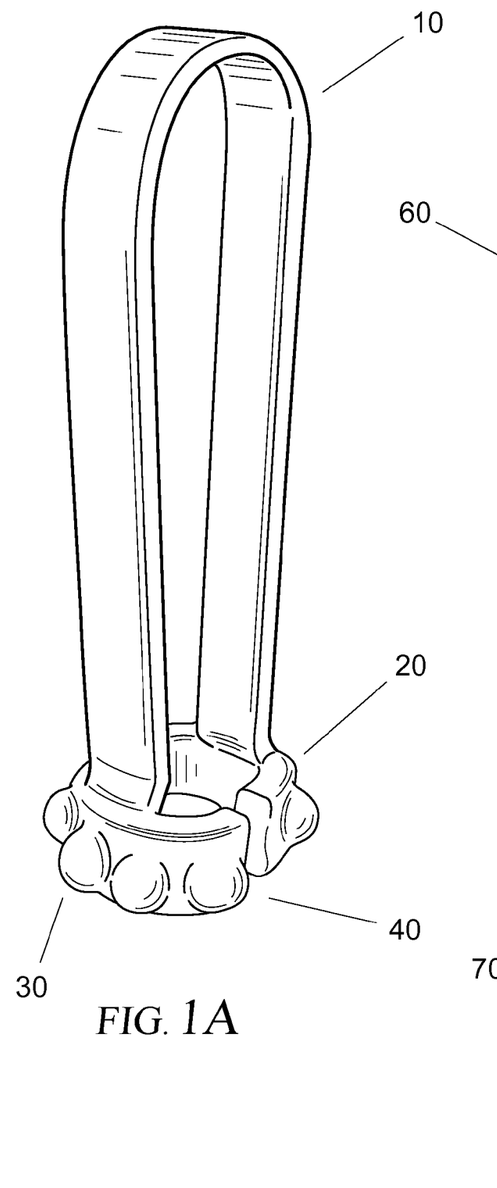
FIG. 1A is a perspective view of the first component of the wheel bearing outer ring extraction tool in accordance with embodiments of the disclosure.

Reference is first made to FIG. 1A, a perspective view of the first component of the wheel bearing outer ring extraction tool. The tool itself is made up of two pieces. This first piece of the tool is comprised of a handle (10) on one end, and on the opposite end, an end (20) used for attachment to the outer ring wheel bearing. This attachment end has two opposing sections of material cut out (40) which allows for the end to be compressed. Along the outer edge of the attachment end are half spheres (30) which allow the attachment end to fit into the wheel bearing outer ring similar to how a bearing would engage the wheel bearing's outer ring.

Figure 1B:
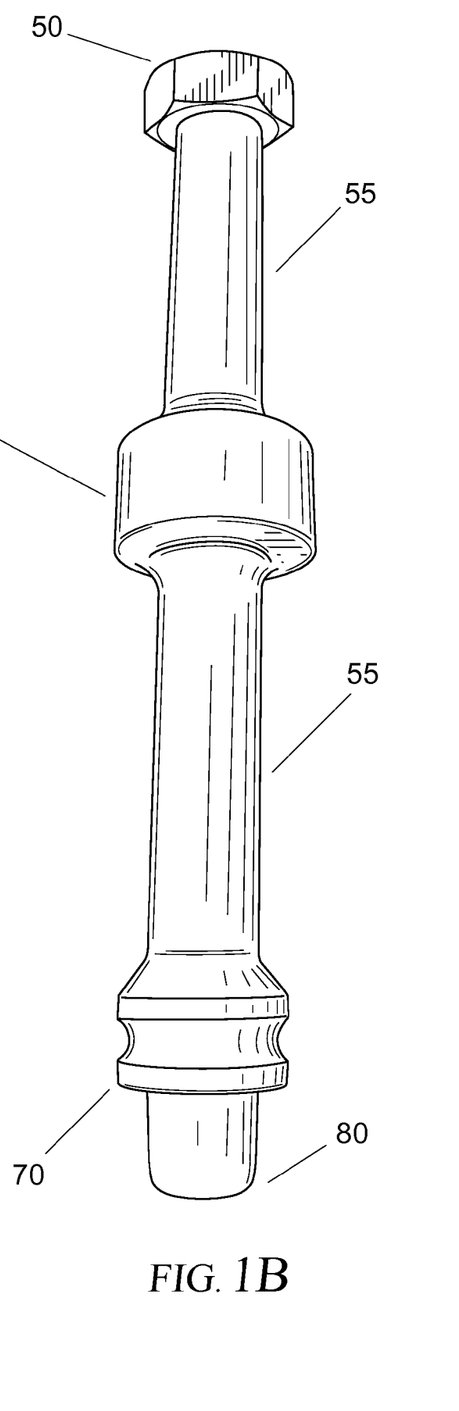
FIG. 1B is a perspective view of the second component of the wheel bearing outer ring extraction tool in accordance with embodiments of the disclosure.

Reference is now made to FIG. 1B, a perspective view of the second component of the wheel bearing outer ring extraction tool. This second piece of the tool is comprised of a rod (55) having a length at least the length of the wheel rim's width. On one end of the rod is a hitting surface (50) to strike blows with a hammer or other hitting device. In the middle of the rod is an extruded feature (60) having a greater diameter for some portion of the rod. The increased diameter is the same diameter as the diameter of the wheel hub. This feature allows the second component of the tool to slide down the wheel hub securely without much oscillation. On the opposite end of the rod from the striking surface is a locking end for the first component of the tool. This end of the second component (80) will slide into the first component of the tool when the first component is locked into the outer ring of the wheel bearing. The extruded part (70) of this locking end keeps the second component of the tool from sliding through the opening of the first component.

Figure 2:
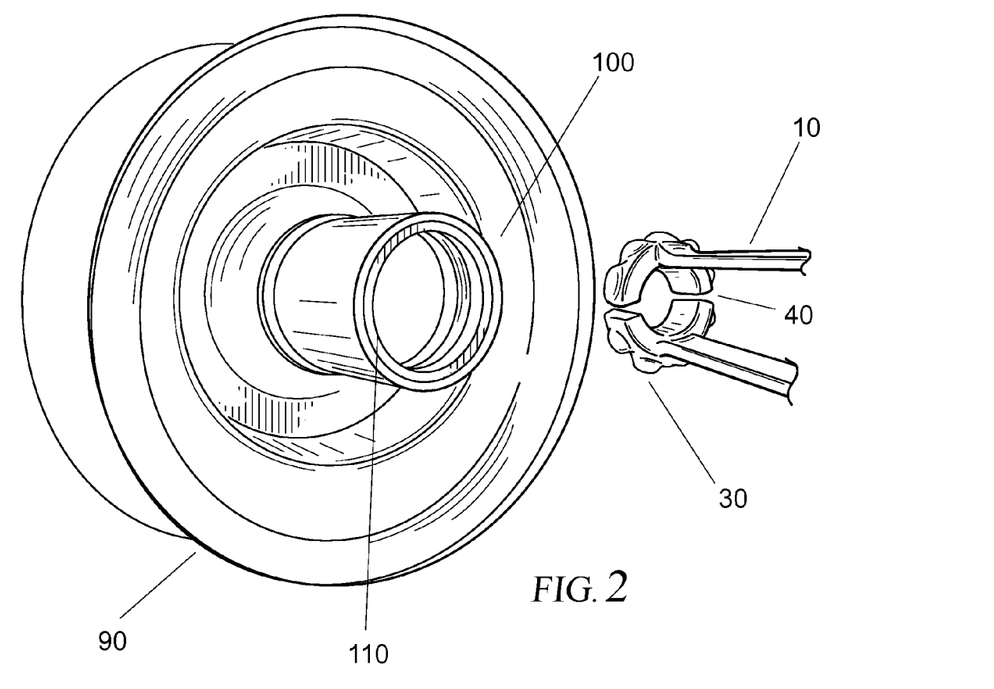
FIG. 2 is a perspective view of the first component of the wheel bearing outer ring extraction tool being inserted into the wheel rim in accordance with embodiments of the disclosure.

Reference is now made to FIG. 2, a perspective view of the first component of the wheel bearing outer ring extraction tool being inserted into the wheel rim. The wheel hub (100) end having the failed wheel bearing with only the wheel bearing outer ring (110) left inside the wheel hub is the side where the first component of the tool will be inserted. The attachment end is inserted first with the individual holding the handle. This is the first step in using the wheel bearing outer ring extraction tool.

Figure 3:
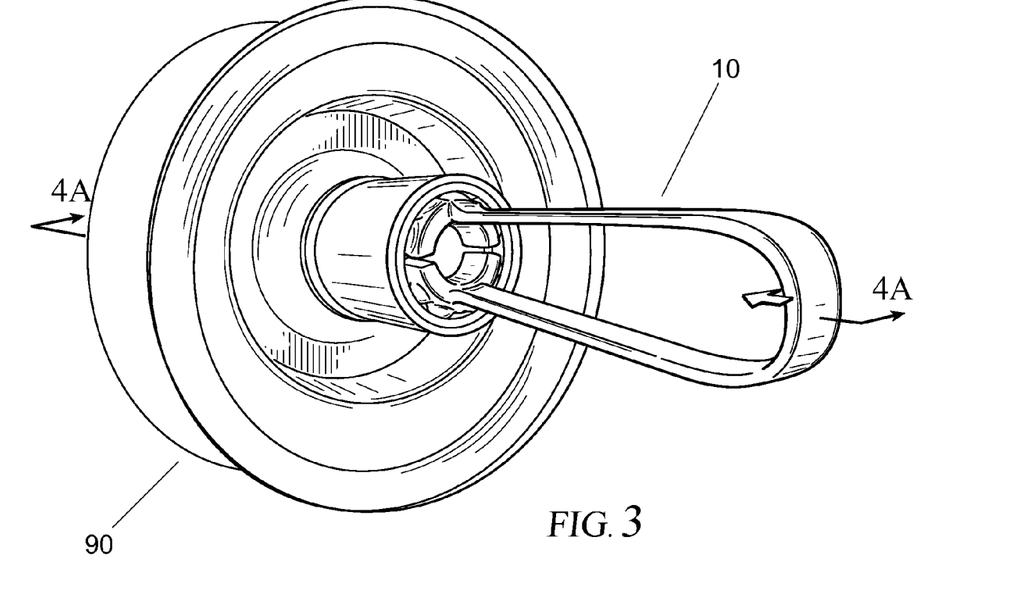
FIG. 3 is a perspective view of the first component of the wheel bearing outer ring extraction tool inserted and locked with the remaining component (the wheel bearing outer ring) of the failed wheel bearing in accordance with embodiments of the disclosure.

Reference is now made to FIG. 3, a perspective view of the first component of the wheel bearing outer ring extraction tool inserted and locked with the remaining component (the wheel bearing outer ring) of the failed wheel bearing. The attachment end of the first piece of the tool is fitted into the wheel bearing's outer ring and locked into the outer ring. This view illustrates the first component locked into place and how the first component is situated with respect to the rim of the wheel.

Figures 4A, 4B, 5:
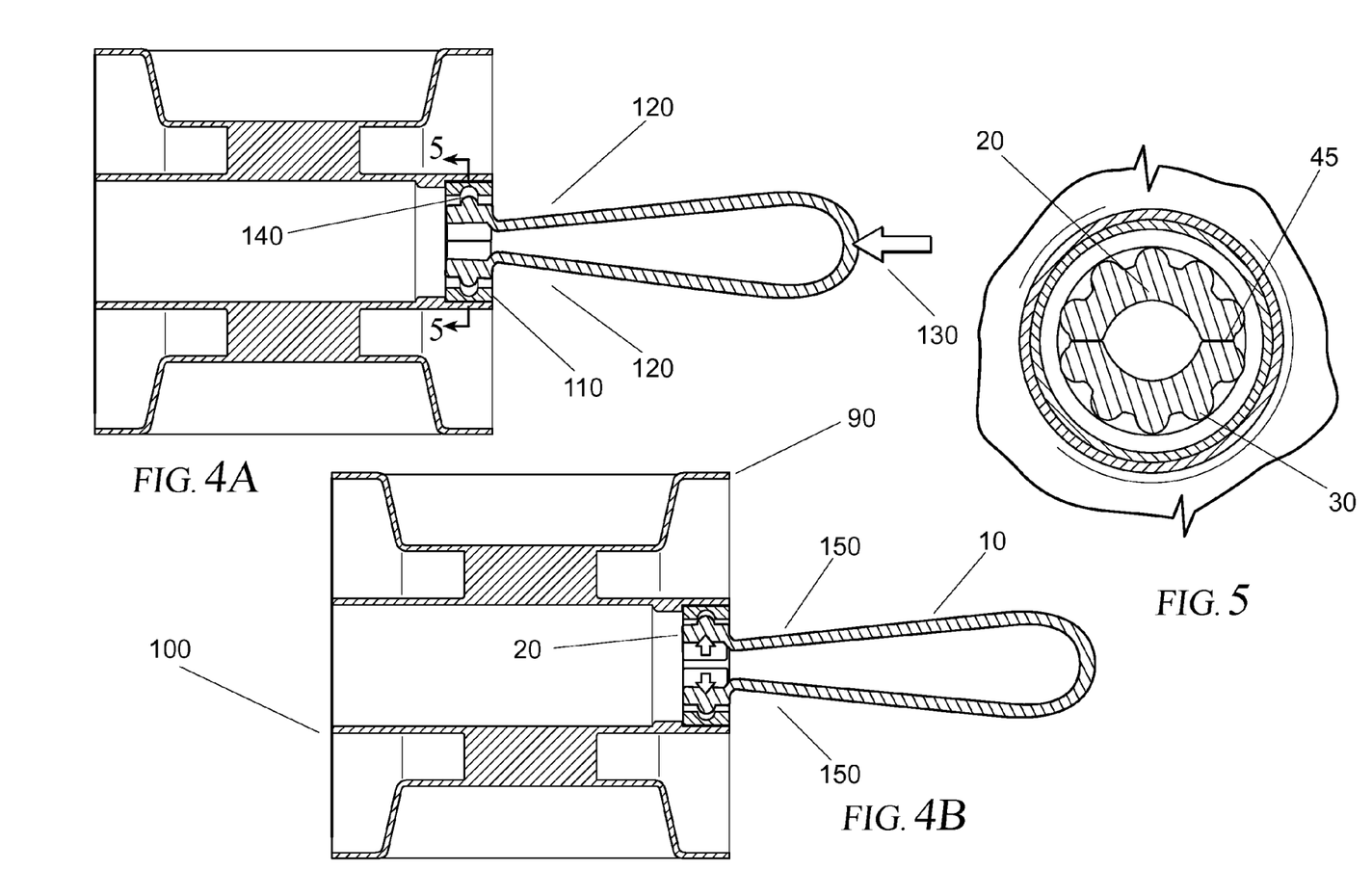
FIG. 4A is a cross-section view of the first component of the wheel bearing outer ring extraction tool, in the depressed position, inserted into a wheel rim to lock into the wheel bearing outer ring in accordance with embodiments of the disclosure.
FIG. 4B is a cross-section view of the first component of the wheel bearing outer ring extraction tool, in the released position, inserted into a wheel rim and locked into the wheel bearing outer ring in accordance with embodiments of the disclosure.
FIG. 5 is a cross-section longitudinal view of the first component of the wheel bearing outer ring extraction tool, in the depressed position, inserted into a wheel rim to lock into the wheel bearing outer ring in accordance with embodiments of the disclosure.

Reference is now made to FIG. 4A, a cross-section view of the first component of the wheel bearing outer ring extraction tool, in the depressed position, inserted into a wheel rim to lock into the wheel bearing outer ring. When the first component of the tool is being inserted into the wheel hub to be locked into the wheel bearing's outer ring, it must be depressed to fit into the wheel hub. The arrow (130) provides the direction of travel for the first component of the tool. To depress the tool, as the user is holding the first component of the tool at the handle portion, with a tweezer like motion with the hand, a sufficient force to close the attachment of the tool should be applied at a mid-way point along both sides of the handle (120). This action closes the attachment end of the tool and allows the attachment end of the tool to fit inside (140) the wheel bearing's outer ring (110).

Reference is now made to FIG. 4B, a cross-section view of the first component of the wheel bearing outer ring extraction tool, in the released position, inserted into a wheel rim and locked into the wheel bearing outer ring. The force applied at the mid-way points of the handle to depress the tool (150) is no longer applied allowing the attachment end (20) to relax to the open position and locking the attachment end into the failed outer ring bearings.

Reference is now made to FIG. 5, a cross-section longitudinal view of the first component of the wheel bearing outer ring extraction tool, in the depressed position, inserted into a wheel rim to lock into the wheel bearing outer ring. This figure illustrates the attachment end (20) in the depressed position having both halves of the attachment end in contact with each other (45). This attachment end closure allows the attachment end to fit into the failed outer ring bearing for locking.

Figure 6:
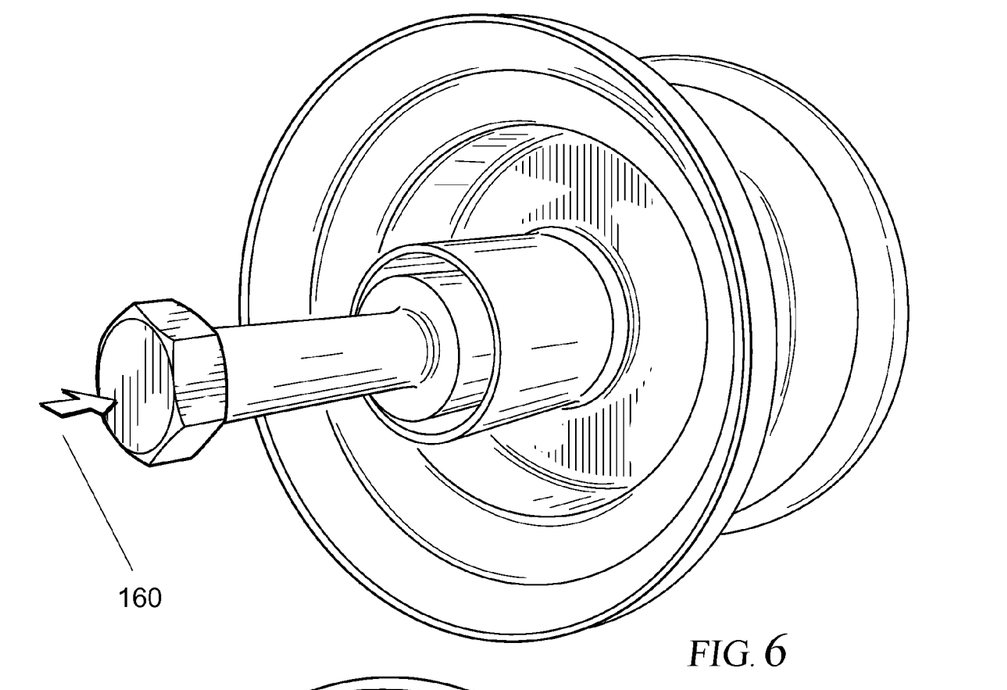
FIG. 6 is a perspective view of the second component of the wheel bearing outer ring extraction tool being inserted into the opposite end, from the first component, of the wheel rim in accordance with embodiments of the disclosure.

Reference is now made to FIG. 6, a perspective view of the second component of the wheel bearing outer ring extraction tool being inserted into the opposite end, from the first component, of the wheel rim. The directional arrow (160) illustrates the direction of the hammering blows to the hammering surface and the direction of travel for the second component of the wheel bearing extraction tool. The second component is inserted after the first component has been locked into the wheel bearing's outer ring.

Figure 7:
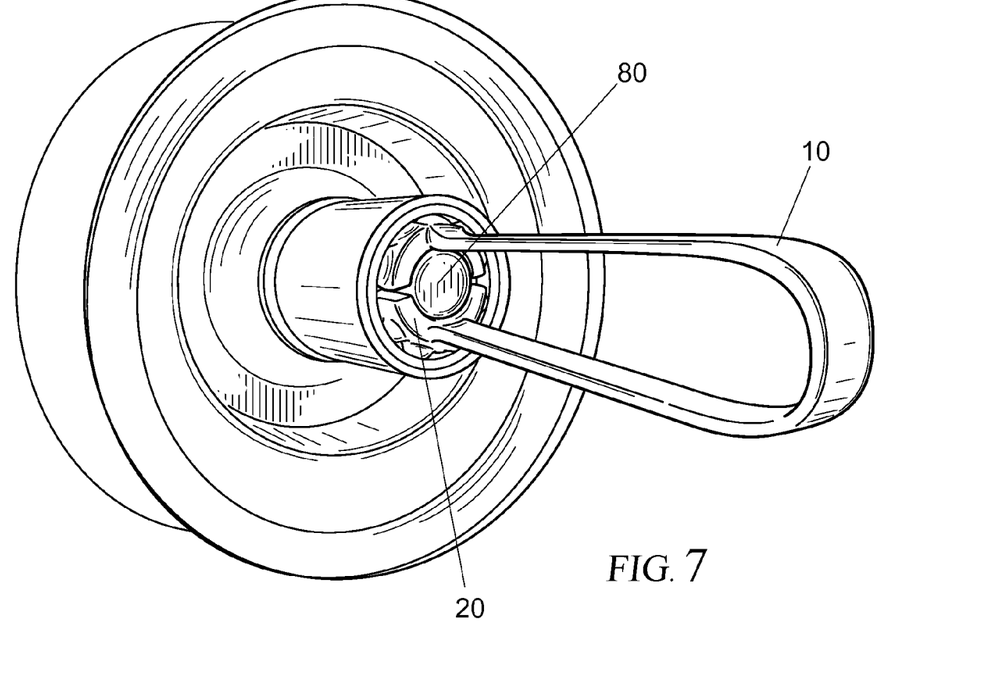
FIG. 7 is a perspective view of the first component of the wheel bearing outer ring extraction tool inserted and locked with the remaining component (the wheel bearing outer ring) of the failed wheel bearing and the second component locked with the first component in accordance with embodiments of the disclosure.

Reference is now made to FIG. 7, a perspective view of the first component of the wheel bearing outer ring extraction tool inserted and locked with the remaining component (the wheel bearing outer ring) of the failed wheel bearing and the second component locked with the first component. The locking end of the second component (80) is shown locked into the locking end of the first component (20). FIG. 7 illustrates, from the reverse side of FIG. 6, both components of the wheel bearing extraction tool engaged with each other and the wheel bearing outer ring. When both components are engaged with each other and the wheel bearing outer ring, the second component is ready to be tapped to extract the wheel bearing outer ring.

Figures 8, 9:
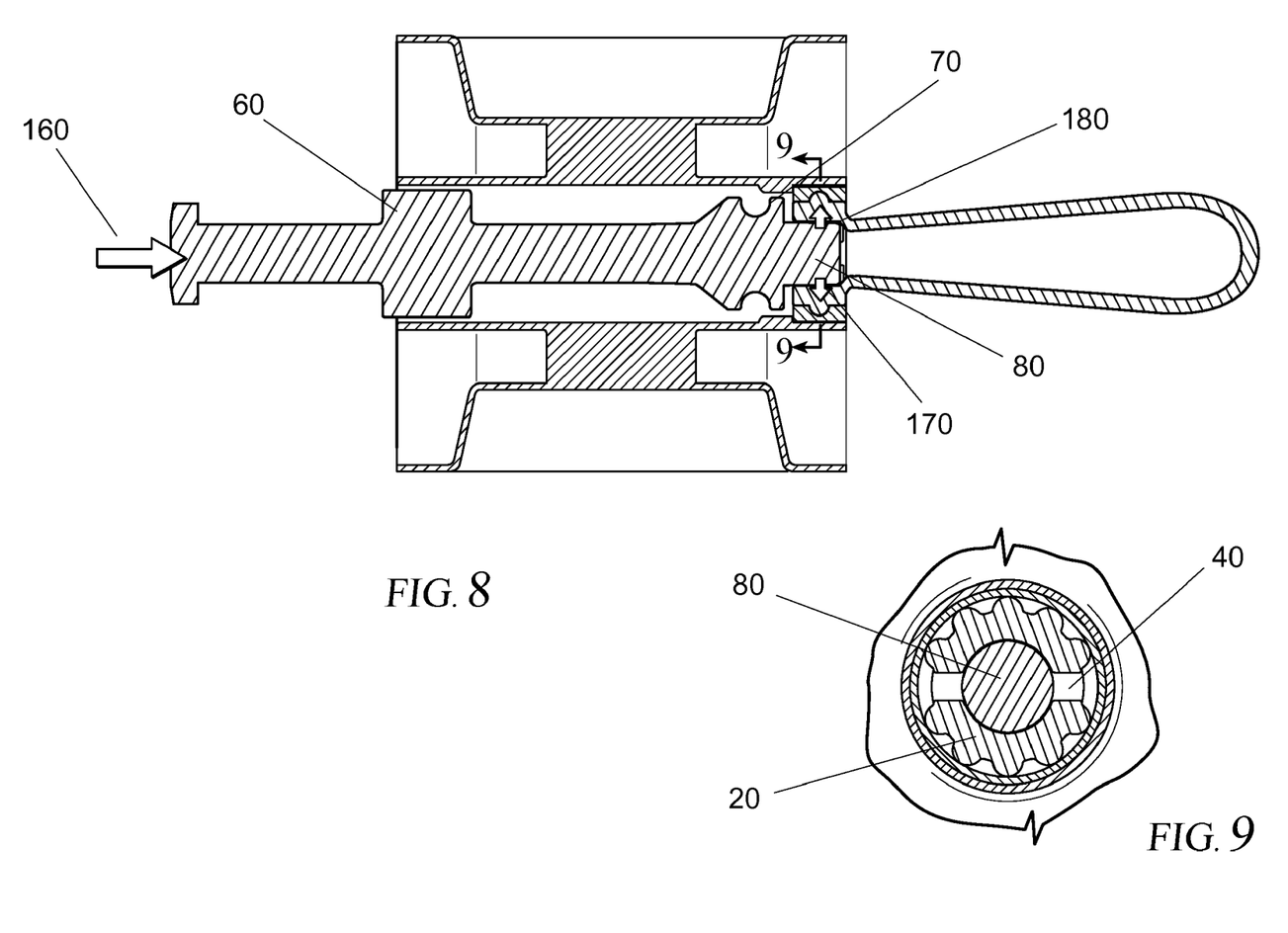
FIG. 8 is a cross-section view of the first component of the wheel bearing outer ring extraction tool inserted and locked with the remaining component (the wheel bearing outer ring) of the failed wheel bearing and the second component locked with the first component in accordance with embodiments of the disclosure.
FIG. 9 is a cross-section longitudinal view of the first component of the wheel bearing outer ring extraction tool inserted and locked with the remaining component (the wheel bearing outer ring) of the failed wheel bearing and the second component locked with the first component in accordance with embodiments of the disclosure.

Reference is now made to FIG. 8, a cross-section view of the first component of the wheel bearing outer ring extraction tool inserted and locked with the remaining component (the wheel bearing outer ring) of the failed wheel bearing and the second component locked with the first component. This view illustrates a cross-sectional view of FIGS. 6 and 7. The directional arrow (160) illustrates the direction of the hammering blows to the hammering surface and the direction of travel for the second component of the wheel bearing extraction tool. The extruded part (70) of this locking end keeps the second component of the tool from sliding through the opening of the first component. The end of the second component (80) forces and helps maintain the engagement of the attachment end of the first component (180) with the wheel bearing's outer ring. This is shown by the directional arrows (170). The attachment end of the first component is in a relaxed position having the attachment end extended and locked into the wheel bearing's outer ring.

Reference is now made to FIG. 9, a cross-section longitudinal view of the first component of the wheel bearing outer ring extraction tool inserted and locked with the remaining component (the wheel bearing outer ring) of the failed wheel bearing and the second component locked with the first component. This view continues to show the end of the second component (80) forcing and maintaining the engagement of the attachment end of the first component (20). The attachment end of the first component is in a relaxed position having the attachment end extended and locked into the wheel bearing's outer ring. This is evidenced by the spacing (40) of the attachment end.

Figure 10:
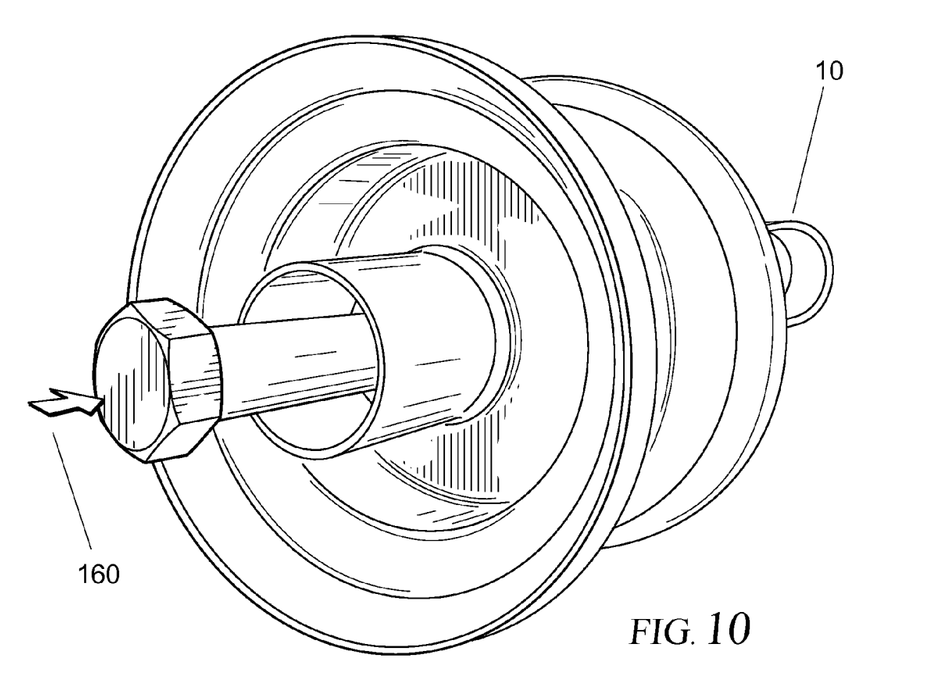
FIG. 10 is a perspective view of the first component and second component of the wheel bearing outer ring extraction tool inserted into the wheel rim in accordance with embodiments of the disclosure. The directional arrow showcases the impact face of the second component and the direction of the impact strike to force out the wheel bearing outer ring in accordance with embodiments of the disclosure.

Reference is now made to FIG. 10, a perspective view of the first component and second component of the wheel bearing outer ring extraction tool inserted into the wheel rim. The directional arrow (160) illustrates the direction of the hammering blows to the hammering surface and the direction of travel for the second component of the wheel bearing extraction tool. This view illustrates the two components after a hammering blow has been made to the hitting surface of the second component. The second component has now travelled into the wheel hub further, extracting on the other end, the wheel bearing's outer ring.

Figure 11:
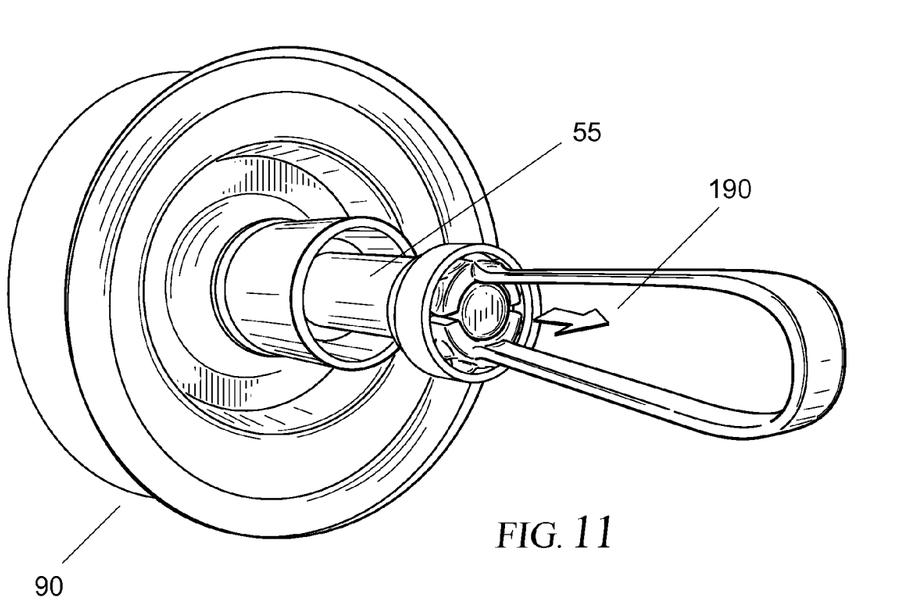
FIG. 11 is a perspective view, after impact, of the first component and second component of the wheel bearing outer ring extraction tool along with the wheel bearing outer ring removed from the wheel rim in accordance with embodiments of the disclosure. The directional arrow showcases the direction of extraction in accordance with embodiments of the disclosure.

Reference is now made to FIG. 11, a perspective view, after impact, of the first component and second component of the wheel bearing outer ring extraction tool along with the wheel bearing outer ring removed from the wheel rim (90). The directional arrow (190) showcases the direction of extraction. FIG. 11 illustrates, from the reverse side of FIG. 10, both components of the wheel bearing extraction tool engaged with each other and the wheel bearing outer ring. This view illustrates the two components after a hammering blow has been made to the hitting surface of the second component. The second component has now travelled into the wheel hub, extracting the wheel bearing's outer ring. The rod (55) portion of the second component of the wheel bearing extraction tool can be seen. The two components of the tool can be seen engaged with one another and with the wheel bearing's outer ring, all being removed from the wheel hub after the hammering blow has been made.

Figure 12:
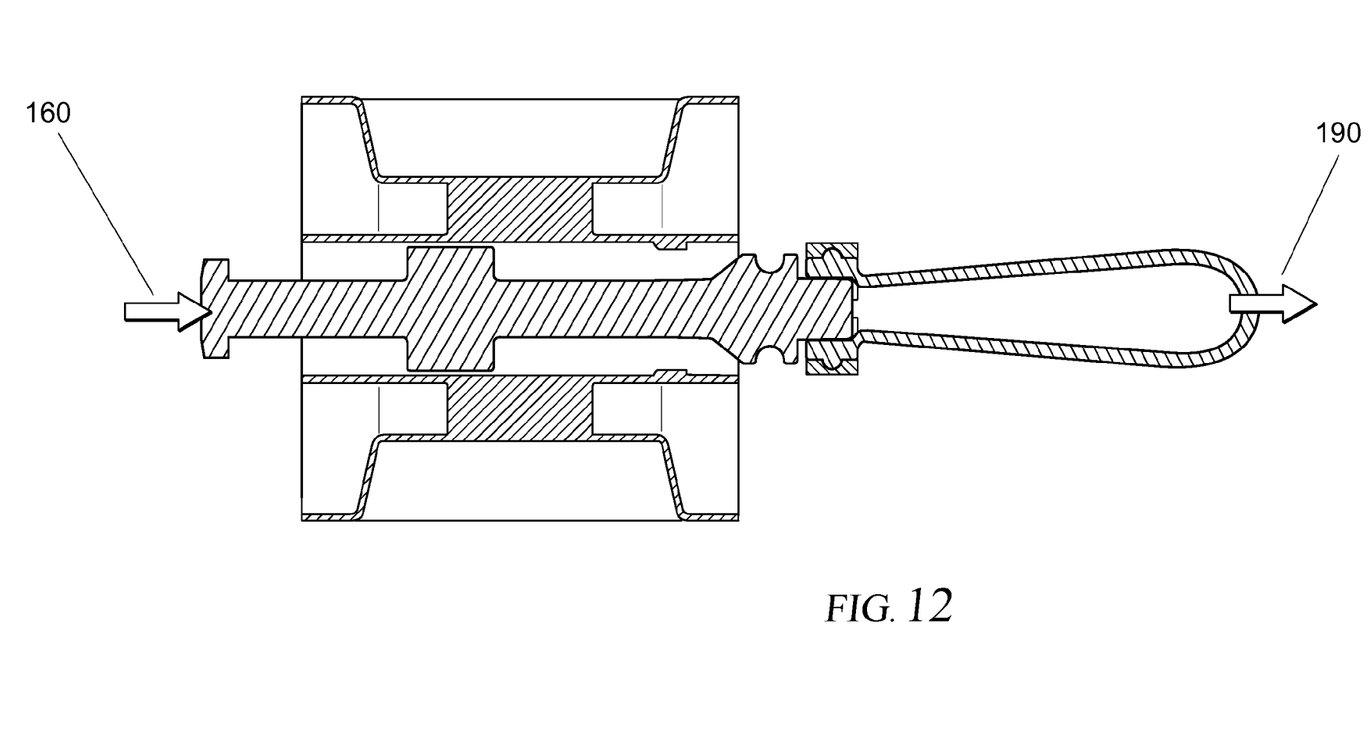
FIG. 12 is a cross-section view, after impact, of the first component and second component of the wheel bearing outer ring extraction tool along with the wheel bearing outer ring removed from the wheel rim in accordance with embodiments of the disclosure. The directional arrow illustrates the direction of extraction in accordance with embodiments of the disclosure.

Reference is now made to FIG. 12, a cross-section view, after impact, of the first component and second component of the wheel bearing outer ring extraction tool along with the wheel bearing outer ring removed from the wheel rim. The directional arrows showcase the direction of extraction (160 and 190). This view is a cross-sectional view of FIGS. 10 and 11.

Figure 13:
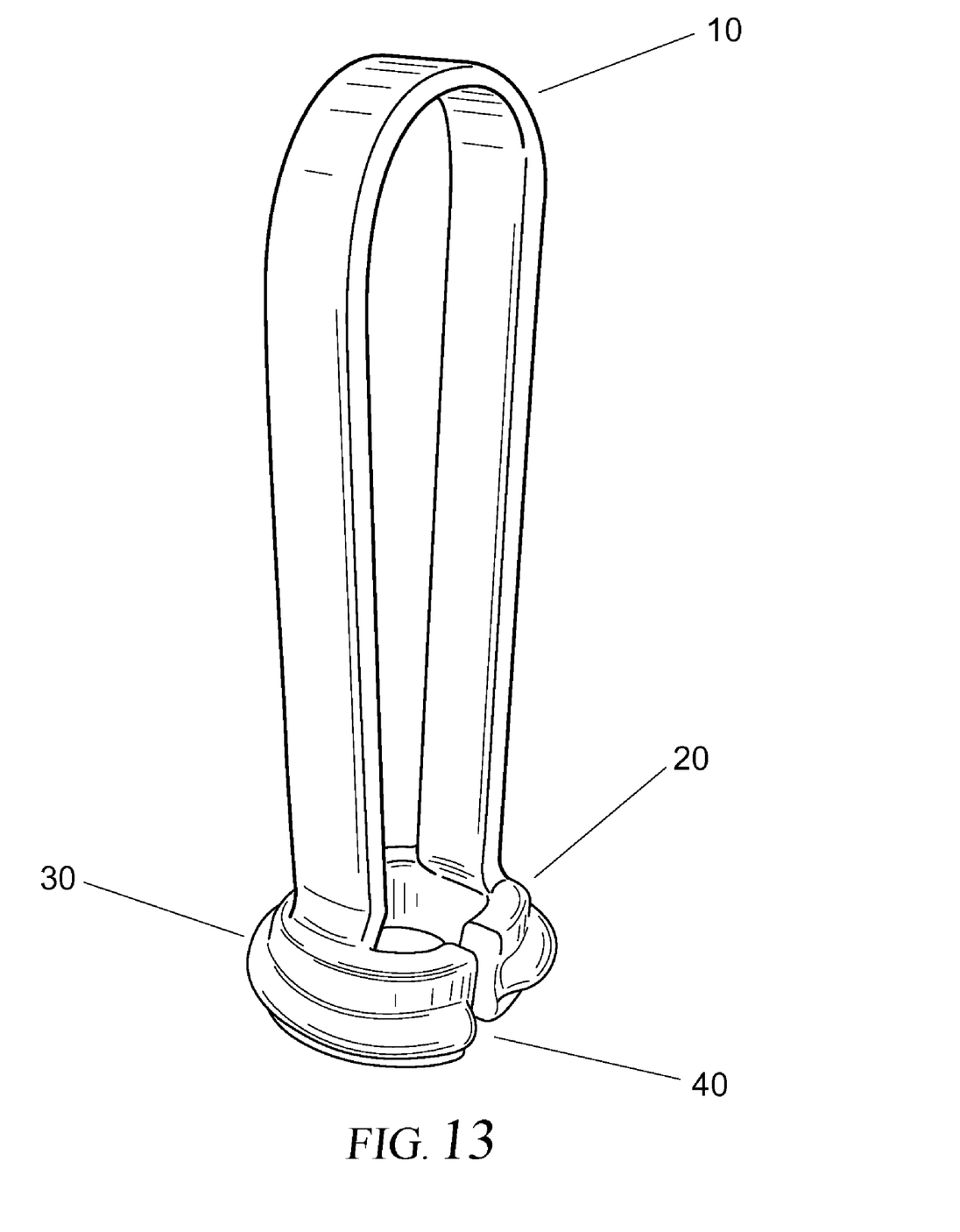
FIG. 13 is a perspective view of an alternate embodiment of the first component of the wheel bearing outer ring extraction tool in accordance with embodiments of the disclosure. This illustration provides another possible embodiment for the locking teeth of the first component.

Reference is now made to FIG. 13, wherein a perspective view of an alternate embodiment of the first component of the wheel bearing outer ring extraction tool is presented. This illustration provides another possible embodiment for the locking teeth or end of the first component's attachment end.

In brief, the wheel bearing outer ring extraction tool as described herein provides for an effective and efficient extraction of the wheel bearing outer ring upon failure of the wheel bearing.

The disclosed tool and method of use is generally described, with examples incorporated as particular embodiments of the invention and to demonstrate the practice and advantages thereof It is understood that the examples are given by way of illustration and are not intended to limit the specification or the claims in any manner.

To facilitate the understanding of this invention, a number of terms may be defined below. Terms defined herein have meanings as commonly understood by a person of ordinary skill in the areas relevant to the present invention. Terms such as "a", "an", and "the" are not intended to refer to only a singular entity, but include the general class of which a specific example may be used for illustration. The terminology herein is used to describe specific embodiments of the invention, but their usage does not delimit the disclosed method, except as may be outlined in the claims.

Alternative applications for this invention include using this tool and method of use for extracting outer rings in failed wheel bearings in various types of machines. Consequently, any embodiments comprising a two piece tool having the structure as herein disclosed with similar function shall fall into the coverage of claims of the present invention and shall lack the novelty and inventive step criteria.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific tool and method of use described herein. Such equivalents are considered to be within the scope of this invention and are covered by the claims.

All publications and patent applications mentioned in the specification are indicative of the level of those skilled in the art to which this invention pertains. All publications and patent application are herein incorporated by reference to the same extent as if each individual publication or patent application was specifically and individually indicated to be incorporated by reference.

In the claims, all transitional phrases such as "comprising," "including," "carrying," "having," "containing," "involving," and the like are to be understood to be open-ended, i.e., to mean including but not limited to. Only the transitional phrases "consisting of" and "consisting essentially of," respectively, shall be closed or semi-closed transitional phrases.

The tool and/or methods disclosed and claimed herein can be made and executed without undue experimentation in light of the present disclosure. While the tool and methods of this invention have been described in terms of preferred embodiments, it will be apparent to those skilled in the art that variations may be applied to the tool and/or methods and in the steps or in the sequence of steps of the method described herein without departing from the concept, spirit, and scope of the invention.

More specifically, it will be apparent that certain components which are both shape and material related may be substituted for the components described herein while the same or similar results would be achieved. All such similar substitutes and modifications apparent to those skilled in the art are deemed to be within the spirit, scope, and concept of the invention as defined by the appended claims.

I claim:

1. A tool for removing a failed wheel bearing's outer ring from a wheel hub of a vehicle or trailer, comprising: a first component of the tool comprising a handle on one end and the opposite end allowing for locking the said bearing's outer ring at the outer ring's inner surface which formerly housed the bearings; said component allowing for insertion into the wheel hub through the end closest to said bearing's outer ring and the locking end also serving as a receiving end for a second component of the tool; said second component comprising a rod having one end used for hammering and the other end for inserting into the wheel hub and locking to said first component and urging said first component's attachment end against said wheel bearing's outer ring.

2. The tool of claim 1, wherein said first component's locking end is comprised of half circles to lock into the bearing's outer ring at the outer ring's inner surface which formerly housed the bearings.

3. The tool of claim 1, wherein said first component's locking end is comprised of material extensions to lock into the bearing's outer ring at the outer ring's inner surface which formerly housed the bearings.

* * * * *